3,062,503
RING CLAMP COMPRESSOR
Charles J. Borrow, Fair Oaks, Calif., assignor to Aerojet-General Corporation, Azusa, Calif., a corporation of Ohio
Filed Jan. 11, 1960, Ser. No. 1,577
4 Claims. (Cl. 254—79)

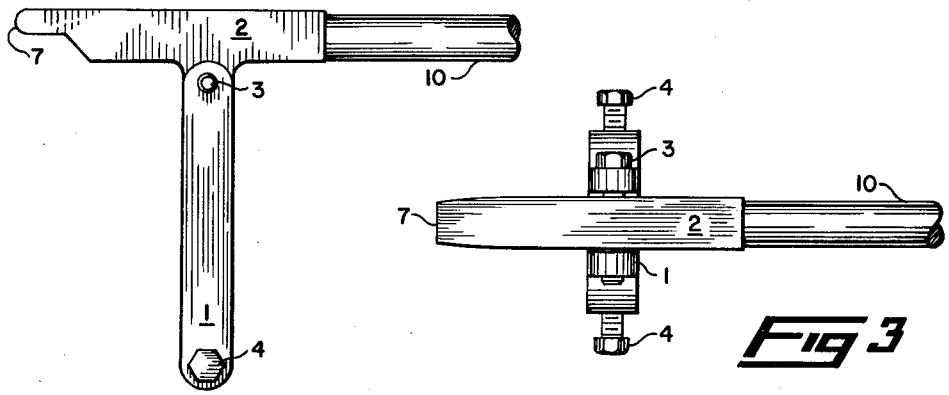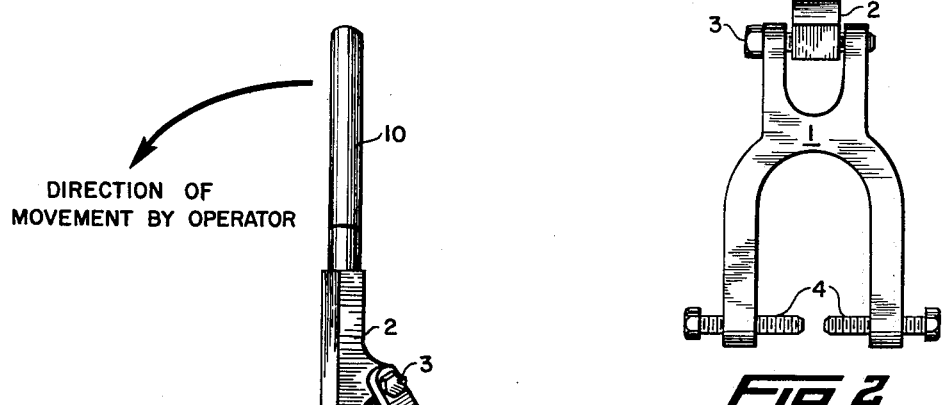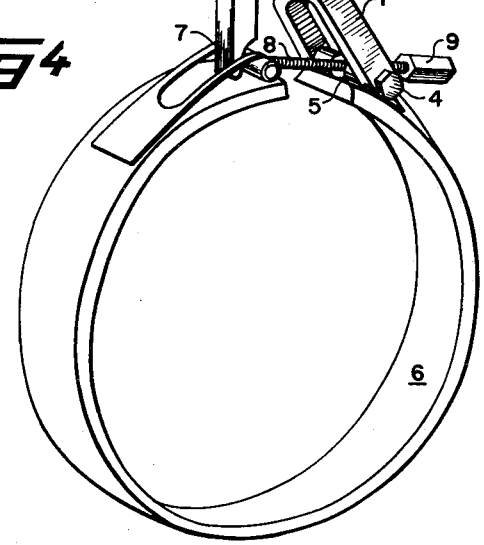

This invention relates generally to ring clamp compressors and particularly to Marmon clamp compressors.

A Marmon clamp is useful in joining a pair of mated, flanged tubular sections. It may generally be described as a circular open-ended member, the ends of which are joined by a bolt member extending from one end through a bracket member mounted on the other. Compression of the clamp member permits the bolt to extend beyond the bracket member to be secured thereto by a nut. Although clamp members are generally fabricated from resilient materials, mechanical assistance in the form of a compressive force is often required to permit an operator to compress the clamp member ends in close enough proximity that the nut may be affixed to the bolt and tightened to cause the clamp end portions to move toward each other, thereby firmly clamping together the flanged tubular sections.

It is therefore a principal object of the present invention to provide a novel method of and improved means for installing a Marmon clamp.

Another object of the present invention is to provide a novel method of and improved means for compression of a Marmon clamp to afford easier installation of the clamp.

In its principal aspect, the present invention comprises a member having a handle or lever at one end and being of reduced cross-section at the other, said member being pivotally mounted between the upper arms of a generally H-shaped body member having inwardly facing screw means threadably arranged within the lower arms of said body member. Said screw means are adapted to be movably extended through said arms in a direction generally transverse to the plane of arcuate movement of said lever member.

These and other objects, aspects, features, and advantages of the present invention will be apparent to those skilled in the art from the following more detailed description taken in conjunction with the appended drawings wherein:

FIG. 1 is a side elevation of the novel Marmon clamp compressor of this invention;

FIG. 2 is a front elevation thereof;

FIG. 3 is a plan view of the Marmon clamp compressor of FIGS. 1 and 2;

FIG. 4 is a perspective view of the novel Marmon clamp compressor of the present invention in operation, affixed to a Marmon clamp.

Referring now to the figures, the generally H-shaped or double-forked body 1 of the Marmon clamp compressor tool carries a lever member or compressor handle member 2 having a handle 10 at one end and being of reduced cross sectional area at its other end 7. The member is pivotally mounted by a bolt 3 between the upper arms of said H-shaped body member 1. Inwardly facing movably extendable bolts or retaining members 4 are arranged within the lower arms of said body member 1 in a direction generally transverse to the plane of arcuate movement of said compressor handle member 2. Said bolts 4 are threaded to fit the holes of the toggle bolt bracket 5 of a Marmon clamp 6, thus securing the compressor tool to the Marmon clamp 6. The smaller end 7 of the compressor handle member 2 is so shaped to enable it to be inserted in back of the toggle bolt 8 in a manner whereby leverage or pressure applied to the compressor handle 10 will compress the Marmon clamp 6 and thus push the toggle bolt 8 through the toggle nut bracket 5 of the Marmon clamp 6 and beyond, in order that the toggle nut 9 may be easily installed on the threaded toggle bolt 8.

It is to be understood that the form of the invention herewith shown and described is to be taken as a preferred example of the same, and that various changes in the shape, size and arrangement of the parts may be resorted to, without departing from the spirit of this invention, or the scope of the claims.

I claim:

1. A device for compressing Marmon-type clamps comprising: a generally H-shaped body member; a lever member pivotally mounted between the upper arms of said body member; and screw means threadably arranged within the lower arms of said body member which are adapted to be movably extended through said arms in a direction toward each other.

2. A device for compression of Marmon-type clamps comprising: a generally H-shaped body member having upper and lower arm pairs; a first bolt means arranged between said upper arm pair; a lever member pivotally mounted intermediate its length on said bolt means; and second bolt means threadably arranged within said lower arm pair which are adapted to movably extend in a direction toward each other and serve as pivots for the H-shaped body member on the toggle bolt bracket in the Marmon type clamp.

3. A device for compression of Marmon-type clamps comprising: a generally H-shaped body member having upper and lower pairs of arms; a first bolt means arranged between said upper arm pair; a lever member pivotally mounted intermediate its length on said bolt means between the upper arms of said H-shaped member, said lever member having a handle at one end and being of reduced cross-section at the other; bolt means threadably arranged within said lower arm pair and adapted to move toward each other in a direction generally transverse to the plane of arcuate movement of said lever member and to serve as pivots for the H-shaped body member on the toggle bolt bracket in the Marmon-type clamp.

4. A device for compressing clamps of the type wherein the ends thereof are brought together by a toggle bolt which extends from one end portion of the clamp through a bracket on the other end of the clamp, said bracket having lateral holes and being adapted to receive a toggle nut to thread upon said bolt comprising: a generally H-shaped member; a lever member pivotally mounted between the upper arms of said H-shaped member, said lever member having an end of reduced diameter and being adapted to bear against the head of said toggle bolt; and retaining means threadably arranged within the lower arms of said H-shaped member and adapted to enter said lateral holes of said toggle bolt bracket to permit the H-shaped member to pivot thereon; whereby arcuate movement of said lever member to bear with increasing pressure upon the head of said toggle bolt will cause said bolt to increasingly extend beyond said bracket and permit the threading of said nut on said bolt with ease.

References Cited in the file of this patent

UNITED STATES PATENTS

| | | |
|---|---|---|
| 146,828 | Ingrum | Jan. 27, 1874 |
| 221,655 | House et al. | Nov. 11, 1879 |
| 275,017 | Case et al. | Apr. 3, 1883 |
| 491,728 | Miller | Feb. 14, 1893 |
| 803,144 | Willett | Oct. 31, 1905 |
| 1,254,962 | Arbuthnot | Jan. 29, 1918 |
| 1,602,419 | Staggers et al. | Oct. 12, 1926 |
| 2,075,382 | Vaughn | Mar. 30, 1937 |
| 2,100,497 | White | Nov. 30, 1937 |
| 2,787,442 | Lewis | Apr. 2, 1957 |
| 2,967,730 | Vann | Jan. 10, 1961 |